US009006630B2

(12) United States Patent (10) Patent No.: US 9,006,630 B2
Richardson et al. (45) Date of Patent: Apr. 14, 2015

(54) QUALITY OF OPTICALLY BLACK REFERENCE PIXELS IN CMOS ISOCS

(75) Inventors: John David Richardson, Calabasas, CA (US); Richard A. Mann, Torrance, CA (US)

(73) Assignee: AltaSens, Inc., Westlake Village, CA (US)

( * ) Notice: Subject to any disclaimer, the term of this patent is extended or adjusted under 35 U.S.C. 154(b) by 285 days.

(21) Appl. No.: 13/349,791

(22) Filed: Jan. 13, 2012

(65) Prior Publication Data

US 2013/0181112 A1    Jul. 18, 2013

(51) Int. Cl.
| *H01L 27/146* | (2006.01) |
| *G01J 1/44* | (2006.01) |
| *H04N 5/361* | (2011.01) |

(52) U.S. Cl.
CPC .................................. *H04N 5/361* (2013.01)

(58) Field of Classification Search
CPC ......... G01J 1/42; G01J 1/44; G01J 2001/444; H01L 27/14; H01L 27/144; H01L 27/146; H01L 31/08–31/09; H04N 3/14; H04N 3/15; H04N 3/155; H04N 5/335; H04N 5/341
USPC ........ 250/208.1, 214 R, 214.1; 348/290–311, 348/221.1, 222.1, E3.021, E5.08, 601, 607; 257/290–292, 440
See application file for complete search history.

(56) References Cited

U.S. PATENT DOCUMENTS

| 7,760,258 | B2 | 7/2010 | Huang et al. |
| 7,791,657 | B2 * | 9/2010 | Joshi et al. ..................... 348/262 |
| 7,839,438 | B2 | 11/2010 | Ahn |
| 7,839,439 | B2 * | 11/2010 | Sato et al. ..................... 348/241 |
| 7,952,634 | B2 * | 5/2011 | Noda et al. ..................... 348/304 |
| 7,999,340 | B2 | 8/2011 | Rossi et al. |
| 7,999,866 | B2 * | 8/2011 | Sonoda et al. ................ 348/245 |
| 8,068,152 | B2 | 11/2011 | Blanquart |
| 8,072,519 | B2 | 12/2011 | Noda et al. |
| 8,089,532 | B2 | 1/2012 | Mo et al. |
| 8,094,215 | B2 | 1/2012 | Richardson |
| 8,665,350 | B2 * | 3/2014 | Richardson et al. .......... 348/241 |
| 2008/0180555 | A1 * | 7/2008 | Sato et al. ..................... 348/248 |
| 2009/0167913 | A1 * | 7/2009 | Takenaka et al. ............. 348/301 |
| 2009/0180014 | A1 * | 7/2009 | Noda et al. ..................... 348/308 |
| 2009/0278962 | A1 | 11/2009 | Richardson et al. |
| 2009/0278963 | A1 | 11/2009 | Shah et al. |
| 2009/0322912 | A1 | 12/2009 | Blanquart |
| 2010/0002094 | A1 * | 1/2010 | Solhusvik et al. ......... 348/230.1 |

* cited by examiner

*Primary Examiner* — Georgia Y Epps
*Assistant Examiner* — Carolynn A Moore
(74) *Attorney, Agent, or Firm* — Amin, Turocy & Watson, LLP

(57) ABSTRACT

Aspects relate to improved optically black reference pixels in a CMOS iSoc sensor. A system can include a pointer P1 that indicates pixels to be read out during a readout time interval, a pointer P2 that indicates pixels to be reset during the time interval, and a pointer P3 that preserves a validity of a frame. The system also includes a pointer P4 configured to mitigate an integration time of column fixed pattern noise (FPN) rows independently of the integration time of other rows. In some aspects, pointer P4 can mitigate blooming into sampled rows from surrounding rows. Pointer P4 can be continuously rotated, in an aspect. Further, in some aspects, pointer P4 can jump on a second cycle to arrive one line before pointer P1.

20 Claims, 10 Drawing Sheets

US 9,006,630 B2

QUALITY OF OPTICALLY BLACK REFERENCE PIXELS IN CMOS ISOCS

BACKGROUND

Technological advances have led to complementary metal-oxide-semiconductor (CMOS) sensor images being leveraged for use in digital cameras, camcorders, video systems, and the like. CMOS is low cost and versatile and, thus, has become the technology of choice for many image sensor arrays. Within CMOS itself, many types of devices intended for visible imaging applications are in use. Such devices can be tailored to large-format still cameras, standard video cameras, and compact "web cam" units, for example, all with varying degrees of size, cost, and performance.

CMOS sensor images can include an integrated circuit with an array of pixel sensors, each of which can comprise a photodetector. Further, a CMOS sensor imager can be incorporated into a System-on-Chip (SoC), which can integrate various components (e.g., analog, digital, and so forth) associated with imaging into a common integrated circuit. For example, the SoC can include a microprocessor, microcontroller, or digital signal processor (DSP) core, memory, analog interfaces (e.g., analog to digital converter, digital to analog converters), and so forth.

Visible imaging systems implemented using CMOS imaging sensors can reduce costs, power consumption, and noise while improving resolution. For example, cameras can use CMOS imaging System-on-Chip (iSoC) sensors that efficiently merge low-noise image detection and signal processing with multiple supporting blocks that can provide timing control, clock drivers, reference voltages, analog to digital conversion, digital to analog conversion, and key signal processing elements. High-performance video cameras can thereby be assembled using a single CMOS integrated circuit supported by few components including a lens and a battery, for example. Accordingly, by leveraging iSoC sensors, camera size can be decreased and battery life can be increased. Also, dual-use cameras have emerged that can employ iSoC sensors to alternately produce high-resolution still images or high definition (HD) video.

A CMOS imaging sensor can include an array of pixel cells, where each pixel cell in the array can include a photodetector (e.g., photogate, photoconductor, photodiode, and so on) that overlays a substrate for yielding a photo-generated charge. A readout circuit can be provided for each pixel cell and can include at least a source follower transistor. The pixel cell can also include a floating diffusion region connected to a gate of the source follower transistor. Accordingly, charge generated by the photodetector can be sent to the floating diffusion region. Further, the imaging sensor can include a transistor for transferring charge from the photodetector to the floating diffusion region and another transistor for resetting the floating diffusion region to a predetermined voltage level prior to charge transference. A floating diffusion region of a pixel cell is commonly reset by opening a circuit to a reset voltage source. Such opening of the circuit can be managed by digital control.

A typical CMOS sensor records images on a frame by frame basis; the amount of light integrated during a particular frame is linearly dependent on the duration of each frame. Additionally, the duration of each frame is inversely related to the sensor frame rate such that faster frame rates allow less light to be integrated into each pixel. Various light integration modes can be employed by a CMOS imaging sensor. For instance, in full frame integration mode, each pixel can be integrated or exposed to a light source at almost any time during the duration of a full frame time except when the pixel is being read and reset. This mode can allow for the maximum amount of light to be integrated in each pixel, which can provide high signal integration. Further, in sub-frame integration mode, each pixel can be integrated or exposed to a light source for a period of time, which is less than a full frame time while maintaining the same frame rate as for the full frame integration mode.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

An aspect relates to a system for improved optically black reference pixels in a complementary metal-oxide-semiconductor (CMOS) imaging system-on-chip (iSoC) sensor. The system includes a read component configured to indicate pixels to be read out during a readout time interval. The system also includes a first reset component configured to indicate pixels to be reset during the readout time interval and a second reset component configured to preserve a validity of a frame during the readout time interval. Further, the system includes a control component configured to facilitate an integration time of column fixed pattern noise (FPN) rows independently of an integration time of other rows. Additionally, the control component can be configured to mitigate the integration time of the column FPN rows as compared to the integration time of the other rows.

Another aspect relates to a method for improved optically black reference pixels in a complementary metal-oxide-semiconductor (CMOS) imaging system-on-chip (iSoC) sensor. The method includes placing a first pointer in idle mode when column fixed pixel noise (FPN) optical black (OB) rows are not being read. The method also includes implementing the first pointer one line before a second pointer arrives at a first column FPN OB row. The method further includes diverting a third pointer and a fourth pointer away from the column FPN OB rows when the third pointer and the fourth pointer reach the column FPN OB rows.

Still another aspect relates to a method that includes indicating pixels to be read out and reset during a read out time interval and preserving a validity of a frame. The method also includes facilitating during the full valid frame an integration time of column fixed pattern noise (FPN) rows independently of an integration time of other rows through utilization of a vertical pointer. In an implementation, the method includes mitigating against the occurrence of extraneous signal(s) blooming into sampled rows from surrounding rows with the vertical pointer.

These and other embodiments are described in more detail below.

BRIEF DESCRIPTION OF THE DRAWINGS

Various non-limiting embodiments are further described with reference to the accompanying drawings in which.

DETAILED DESCRIPTION

Figure 1:
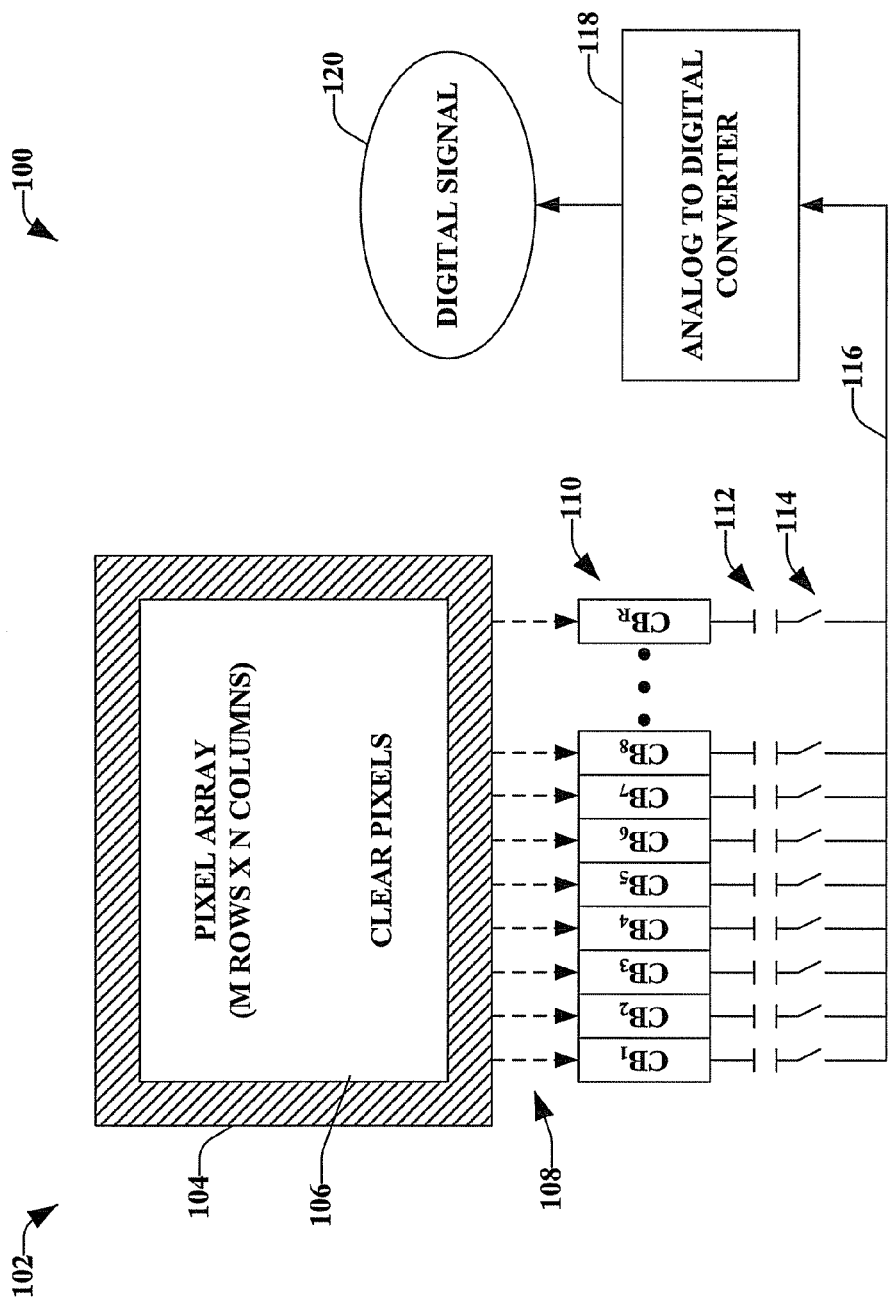
FIG. 1 illustrates a system that generates digital signals by employing a CMOS sensor imager.

Conventional complementary metal-oxide-semiconductor (CMOS) imaging Sensors-on-Chip (iSoC) can be prone to revealing undesirable artifacts (e.g., rolling shutter skew, partial exposure, and so forth) arising from some beneficial readout architectures that exist on the CMOS iSoC for reading the output images. The basis of optical image detection in a CMOS iSoC is charge accumulated within an optically sensitive element known as a photodiode. Since it can be efficient to integrate only one signal storage site at each pixel, specifically the photodiode and ancillary capacitances, the image typically is formed on a row-by-row basis rather than simultaneously across the entire image sensor.

The photodiode is a floating, reverse-biased silicon p-n junction diode. A photon incident upon the depletion zone of such a diode may, depending upon its wavelength and probabilistic factors, be capable of promoting an electron from the valance band to the conduction band, leaving behind a hole. For example, the reverse-biased diode can have a depletion zone around the junction and, when a photon is incident on that depletion zone, the photon can have a certain probability to convert an electron, which gives rise to an optical image. The resultant electrons and holes can drift along the electric field lines created by the reverse-bias potential. The drifting of the electrons and holes can occur until collected by the conducting electrode of the opposite sign.

The total number of accumulated electrons within a defined unit of time can serve as a proportional analog for the number of photons incident upon the volume of silicon occupied by the photodiode's depletion zone. The collection of electron-hole pairs continues to a limit, which occurs when the floating diode is neutralized. The point at which the floating diode is neutralized is referred to as the "full-well".

An idealized sensor is a sensor in which the charge information is immediately (or as quickly as possible) converted to digital information. Once information is stored in the digital domain, the potential for corruption is minimized (e.g., rendered almost non-corruptible). In reality, demands for high spatial resolution, high sensitivity (fill factor) and small optical formats drive the technology towards minimal functionality and maximum areal efficiency within the pixel.

Megapixel CMOS imaging arrays typically have only around three to around five transistors per pixel. Therefore, the accumulated charge information should be relayed to remote digitizers. This can be accomplished with small numbers of high speed analog-to-digital converters (ADCs) and an elaborate analog fan-in (e.g., used to add or combine multiple analog signals and ORs logic signals for later processing). The charge can be converted to a voltage at the pixel and the voltage information can be transmitted through several buffering/amplification stages.

Such analog readout schemes tend to introduce undesirable artifacts within the output image. These artifacts are especially noticeable in low-light/high-gain scenarios in which a large proportion of the dynamic range is supplied to the read noise. In video applications, the most aesthetically pleasing dark image is one in which only uniform (e.g., nearly flawless) Gaussian pixel temporal noise is visible. Any additional visible noise types are undesirable. In particular, the presence of any fixed pattern noise (FPN) can be undesirable. For example, anything that is present in the image that does not change frame-to-frame is not desired.

One particularly egregious artifact is known as "column FPN". This appears primarily as a consequence of having an independent analog buffer within each column. Each buffer may introduce a small, random offset resulting in visible vertical stripes within a dark image.

A purely digital correction scheme can be employed to address column FPN. For example, a subset of optically black pixels can be used to measure the voltage offset of each column. The optically black pixels can be on the top of every column to indicate the offset of the particular column. These column offset values can be stored in RAM (Random Access Memory) or another type of storage media. Further, the column offset values can be subtracted from the data from the optically sensitive (clear) portion of the pixel array.

The efficacy of such a correction may be limited by many factors including the quality of the small available sample of optical black (OB) pixels per column and their fidelity with respect to the clear pixels. In particular, the most significant quadratic term describing the performance limit is proportional to the magnitude of pixel FPN within the OB pixels. For example, the number of OBs available is a direct statistical term that depends on the square root of the number of OBs available in terms of the precision of the column offset computation. Thus, the most significant quadratic term depends on the pixel FPN, which is the pixel to pixel offset standard deviation divided by the square root of optical black pixels in the column.

The pixel FPN has two components which sum in quadrature. The two components are (1) a fixed component (minimal pixel FPN) and (2) a component which scales linearly with integration time (the DSNU (Dark Signal Non-Uniformity) term). DSNU can be caused by (and be mathematically equivalent to) the pixel-wise dispersion of dark current. The DSNU might dominate the pixel FPN, particularly at elevated temperatures and at large integration times.

Another limiting factor arises from the number of available OB pixels. The more OBs available, the lower the statistical error in the column offset estimate. It is thus desirable in video applications to use all of the OB information for which there is the time to sample. This, however, might be limited by the available vertical blanking period which is dictated by the SMPTE (Society of Motion Picture and Television Engineers) video standards. For example the high definition 1080P standard has 1125 line periods and 1080 image lines per frame. Therefore, the maximum OB pixels that could theoretically be sampled is 45 per column.

In a regular rolling shutter application dictated by efficient pixel design, wherein the accumulated signal is stored directly on the photodiode and assorted capacitances, an array is scanned one row at a time for readout. Thus, the pixels are not exposed at the same time but are reset in sequence line-by-line and read out in sequence, line-by-line. Consequently, in such a rolling shutter application, all of the sampled OBs cannot be utilized for correction. For example, the OBs at the edges of the sampled window are adjacent to pixels which are not routinely reset since they are not visited by the rolling (vertical) pointers. These non-reset pixels overflow with charge, which may spill into neighboring pixels, known as "blooming". For example, in blooming, the pixels are saturated with dark current and any charge that is generated beyond the saturation limit can overwhelm the storage site and migrate to neighboring pixels. Therefore, edge pixels tend not to have high fidelity since they can often become corrupted by charge spilling into them from their blooming neighbors.

To address the problem of blooming, the disclosed aspects provide a vertical pointer that addresses the limitation of DSNU within optically black pixels. Further, the vertical pointer can provide for a means to use all (or substantially all) of the available OB pixel statistics by making the sampled OBs immune to blooming. Further, the disclosed aspects can provide an independent exposure time in the optically black pixel being used for the correction. In accordance with some aspects, the disclosed aspects can improve quality of optically black reference pixels by enabling shortening of the integration time relative to the active pixel integration time. The exposure time of the optically black pixel is independent of what is occurring in the remainder of the array, according to an aspect. As used herein, the vertical pointer might alternatively be referred to as an "additional pointer", "additional vertical pointer", "first pointer" or "P4".

Herein, an overview of some of the embodiments for improving the quality of optically black reference pixels in CMOS iSoCs has been presented above. As a roadmap for what follows next, various exemplary, non-limiting embodiments and features for improving the quality of optically black reference pixels in CMOS iSoCs are described in more detail. Then, some non-limiting implementations and examples are given for additional illustration, followed by a representative operating environment in which such embodiments and/or features can be implemented.

With reference to FIG. 1, illustrated is a system 100 that generates digital signals by employing a CMOS sensor imager. The system 100 can be associated with a CMOS sensor imager utilized in connection with a camcorder, digital camera, microscope, video system, and/or the like. The system 100 comprises a pixel array 102 that can include M rows and N columns of pixel cells, where M and N can be any integers. Each pixel in the pixel array 102 can comprise a photodetector (e.g., photogate, photoconductor, photodiode, and so forth). Further, each pixel in the pixel array 102 can be utilized to detect a particular color of light; thus, a subset of the pixels in the pixel array 102 can operate in response to red light (R pixels), a disparate subset of the pixels can operate based upon blue light (B pixels) and a further subset of the pixels can operate as a function of green light (G pixels). Other color filter combination can also be used with the so-called Bayer construction most dominant.

The pixel array 102 can include a portion 104 covered by metal. The metal covered portion 104 can include optical black pixels; thus, pixels included in the metal covered portion 104 lack exposure to light due to being covered by metal sufficiently opaque to transmission of light, as discussed in U.S. Pat. No. 7,999,340, entitled "Apparatus and method for forming optical black pixels with uniformly low dark current", which is incorporated by reference herein. Any number of rows (out of the M rows) and/or columns (out of the N columns) can be included in the metal covered portion 104 of the pixel array 102. The pixel array 102 can additionally include a clear pixel portion 106. Pixels in the clear pixel portion 106 can be exposed to light. It is to be appreciated that any number of rows and/or columns can be included in the clear pixel portion 106. Moreover, the metal covered portion 104 can, but need not, be symmetrically located upon the pixel array 102 with respect to the clear pixel portion 106. For example, a first number of rows can be covered by metal at a top of the pixel array 102 and a second number of rows can be covered by metal at a bottom of the pixel array 102 such that the first and second numbers can be the same or different.

An image focused on the pixel array 102 (e.g., the clear pixel portion 106) can cause the pixels to convert incident light into electrical energy. Signals obtained by the pixel array 102 can be processed on a column by column basis; thus, a particular row of pixels from the pixel array 102 can be selected to be read. The system 100 can further include a plurality of read buses 108 that can transfer the contents from the pixels in the pixel array 102 in the selected row. According to an illustration, the system 100 can include Q read buses 108, where each read bus 108 can be associated with a respective column of the pixel array 102 and where Q is an integer. By way of further example, pixels in the pixel array 102 can share read buses 108, and thus, the system 100 can include fewer than Q read buses 108.

Each read bus 108 can carry content (e.g., sampled signals) from the pixels to a respective column buffer (CB) 110. The system 100 can include R column buffers 110 or fewer, for instance, where R is an integer. The column buffers 110 can amplify (e.g., condition) the signals from the pixels. Further, each column buffer 110 can enable low noise readout and can condition the signal from a pixel positioned at one of the rows in the column (or columns) corresponding to the column buffer 110.

After processing by the column buffers 110, outputted values from each of the column buffers 110 can be retained. Moreover, each of the column buffers 110 can be associated with respective circuitry such as, for instance, a respective capacitor 112 and switch 114. Such circuitry can sample and hold outputted values from the corresponding column buffers 110. For example, the capacitors 112 can be loaded with the outputted values from the corresponding column buffers 110. Further, the switches 114 can be closed one at a time to allow for connecting to a bus 116; thus, the voltages generated by the column buffers 110 can be multiplexed over the bus 116. The bus 116 can enable communicating each of the outputted values from the respective column buffers 110 to an analog to digital converter (ADC) 118. The ADC 118 can digitize the sampled signal to yield a digital signal 120. The digital signal can thereafter be provided to disparate component(s) (not shown) for further processing, manipulation, storage, and so forth.

Images yielded from the digital signal 120 can be negatively impacted by fixed pattern noise (FPN). Fixed pattern noise can be introduced into the signal based upon processing effectuated within the system 100 (e.g., by the pixels of the pixel array 102, column buffers 110, ADC 118, and so forth). For example, different pixels can yield disparate, respective fixed pattern noise, differing column buffers 110 can generate differing, respective fixed pattern noise, and so forth (e.g., due to mismatch between the pixels, column buffers 110, and so on). Accordingly, calibration techniques can be employed to mitigate the fixed pattern noise.

The optical black pixels in the metal covered portion 104 of the pixel array 102 can be employed for calibration by providing references from which noise levels can be deduced. By way of illustration, a row of optical black pixels in the metal covered portion 104 can be selected to be read. Since this row of optical black pixels fail to receive light, signals yielded by each of these pixels lack correlation to incident light upon the pixel array 102 (e.g., zero input is provided to the optical black pixels). The signals generated by the optical black pixels can be processed in a similar manner as compared to pixels from the clear pixel portion 106 of the pixel array 102 (e.g., pixels in the same column can be read through the same column buffer 110). Since zero input is provided to the optical black pixels, it can be expected that zero output should be yielded upon processing; however, noise can be included in the outputted signals.

Accordingly, calibration can be effectuated to determine the noise associated with each column, which can be referred to as the column fixed pattern noise (column FPN). Noise values associated with each column of the pixel array 102 can be determined during calibration. For example, digital signals corresponding to the row of optical black pixels can be retained in a line of memory, where each of the digital signals can correlate to noise of a particular column. Thereafter, the set of noise values from the line of memory can be utilized during a correction phase to mitigate column FPN within the outputted digital signal (e.g., subtract a noise value associated with a particular column from a signal value of a clear pixel from the particular column).

According to some aspects, digital signals from any number of rows of optical black pixels can be combined in any manner. For example, various calibration algorithms can be utilized by the system 100 (e.g., determining average, median, mode, and so forth, of digital signals from optical black pixels in each column over time, aging out older values of digital signals from optical black pixels, and so on).

In accordance with some aspects, each analog readout element (e.g., column buffer, line-driver, analog PGA (Programmable Gain Amplifier) and ADC) can introduce a finite offset deviation. The net combinatorial effect of the finite offset deviations, results in column FPN. In some aspects, a pure digital correction is utilized to render the column offsets uniform.

The individual (signed) offset of each column can be determined using representative optically black (OB) pixels, which can be stored in memory. When the clear pixels are being read, the offsets can be accordingly subtracted. Assuming all variations are Gaussian, the "post-correction" column FPN, $\sigma_c$ depends on: the pixel FPN, $\sigma_P$, within the OB pixels and the number of available OB pixels per column $n_{OB}$ $$\sigma_c = \sigma_P / \sqrt{n_{OB}}$$

In order for the column FPN correction to be effective, in post correction the resulting column FPN should be less than one-tenth (<1/10) of the pixel noise in still capture applications and less than one-twentieth (<1/20) of the pixel read noise in video applications at 60 Hz frame rate.

Since the column FPN depends linearly on the pixel FPN within the OB pixels, every possible measure should be taken to minimize the pixel FPN. The pixel FPN, $\sigma_P$, is normally dominated by dark current dispersion (DSNU) especially at realistic operating temperatures and significant integration times.

$$\sigma_P = \sqrt{(m^2 + t^2 \cdot D^2)}$$

where m is the minimal pixel FPN, t is the integration time, and D is the DSNU.

Figure 2:
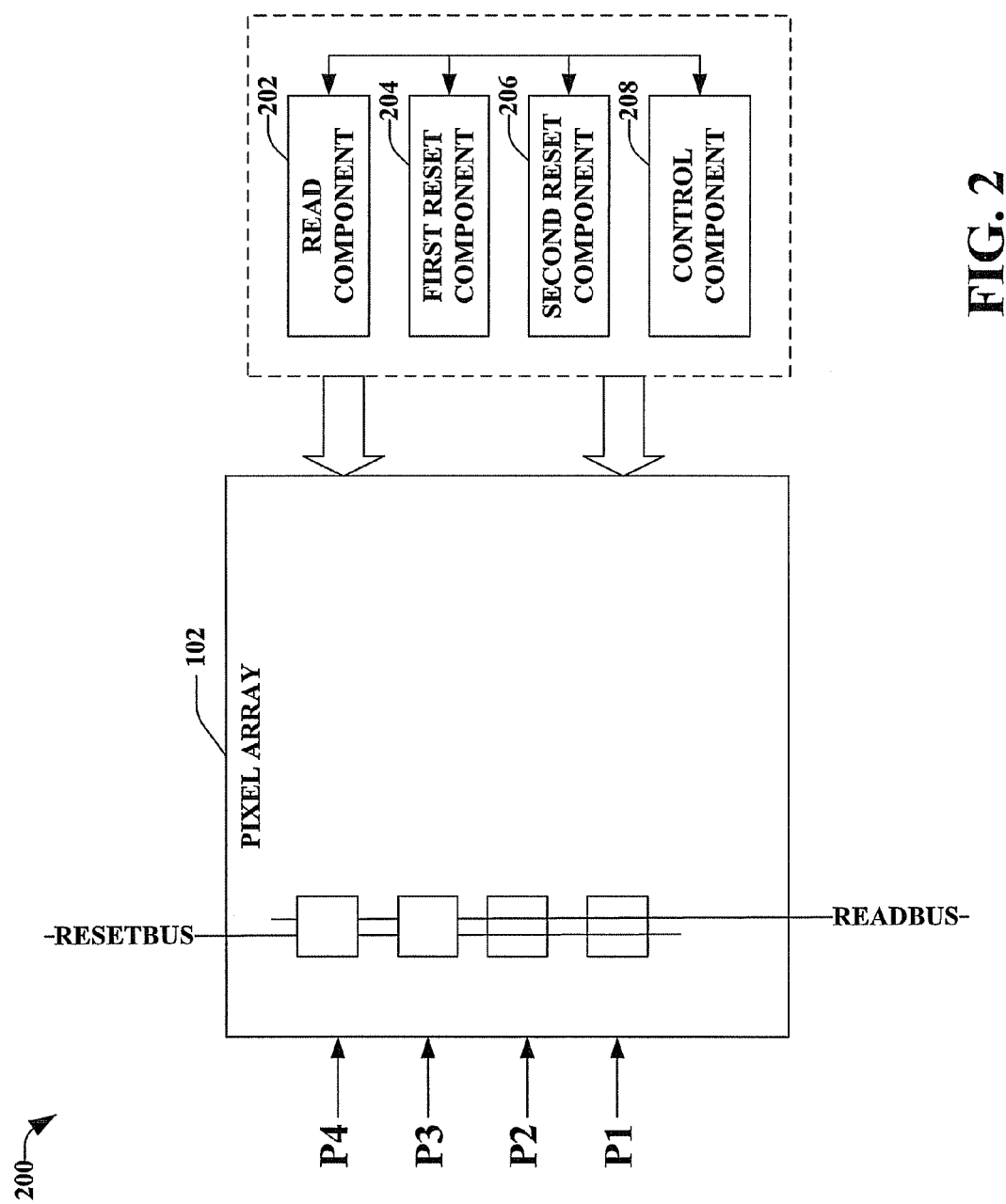
FIG. 2 illustrates a system configured to improve optically black reference pixels in a complementary metal-oxide-semiconductor imaging system-on-chip sensor, according to an aspect.

In accordance with some aspects as illustrated by the example system 200 of FIG. 2, vertical reset pointers (P1, P2, P3, and P4) are provided to operate the OB rows that are used for the column FPN correction independently from the other rows. For example, the OB rows for column FPN correction can have an independent integration time with respect to the other rows. The independent integration time can be tuned to and held at its minimum (e.g., 1 line).

The example system 200 includes a pixel array 102, which comprises a plurality of pixels, where four pixels are represented by the blocks in the pixel array 102. The system 200 can include a read component 202 that is configured to determine the line that is currently being read out. In an aspect, read component 202 can be configured to indicate pixels to be read out during a readout time interval In some aspects, read component 202 can be configured to control pointer P1.

Also included in system is a first reset component 204 configured to indicate pixels to be reset during the readout time interval. In an example, first reset component 204 is configured to effect a second reset phase for each row, which provides tunable sub-frame integration times. In an aspect, first reset component 204 is configured to control pointer P2.

System 200 also includes a second reset component 206 configured to preserve a validity of a frame. For example, the second reset component 206 can be configured to phase pointer P3 in and out of existence when changes are made to a vertical window or an integration time. The transient nature of pointer P3 can be utilized to preserve the validity of the frame which follows such changes.

The system 200 also includes a control component 208 configured to facilitate an integration time of column fixed pattern noise (FPN) rows independently of the integration time of other rows. In some aspects, control component 208 can be configured to mitigate the integration time of FPN rows. For example, control component 208 can be configured to retain the integration time of the column FPN rows to the minimal value, independent of what the other rows are doing. Such independent integration time management can facilitate minimizing the pixel FPN, according to an aspect.

Depending on the implementation details, the control component 208 can also be configured to provide a means of mitigating blooming into the sampled rows from the surrounding rows. For example, the control component 208 can be configured to mitigate blooming into the OB rows from their neighbors which previously were not reset with an implementation that utilizes the read component 202 and the first reset component 204. In another example, the control component 208 can be configured to mitigate blooming into the first clear row and the last clear row, which otherwise also has neighboring non-reset rows.

In accordance with some aspects, control component 208 can be configured to manage pointer P4. For example, control component 208 can be configured to place pointer P4 in an idle mode when column FPN OB rows are not being read out and can implement pointer P4 one line before read component 202 (e.g., pointer P1) arrives at a first column FPN OB row. Further to this aspect, first reset component 204 and second reset component 206 can be configured to divert pointers P2 and P3, respectively, away from the column FPN OB rows when pointers P2 and P3 reach the column FPN OB rows.

In accordance with some aspects, control component 208 can be configured to allocate a first subset of dummy rows to pointer P4 and first reset component 204 can be configured to allocate a second subset of dummy rows to pointer P2. The first set of dummy rows can be independent of the second subset of dummy rows. Further to this aspect, control component 208 can be configured to send pointer P4 to the first subset of dummy rows when the column FPN OB rows are not being read.

In accordance with some aspects, control component 208 is configured to continuously rotate pointer P4 within the column FPN OB rows. According to some aspects, control component 208 is configured to jump pointer P4 on the second cycle such that pointer P4 arrives at the first FPN OB row one line before pointer P1 arrives at the first FPN OB row.

According to some aspects, control component 208 is configured to extend an activity region of pointer P4 to rows that are not read. Further to this aspect, control component 208 can cycle pointer P4 within the rows that are not read and can jump pointer P4 to a start of the FPN OB window one line ahead of pointer P1.

In other aspects, control component 208 can be configured to use pointer P4 to reset a set of extra rows around an active window. Further to this aspect, control component 208 can be configured to synchronize pointer P4 to a frame.

Figure 3:
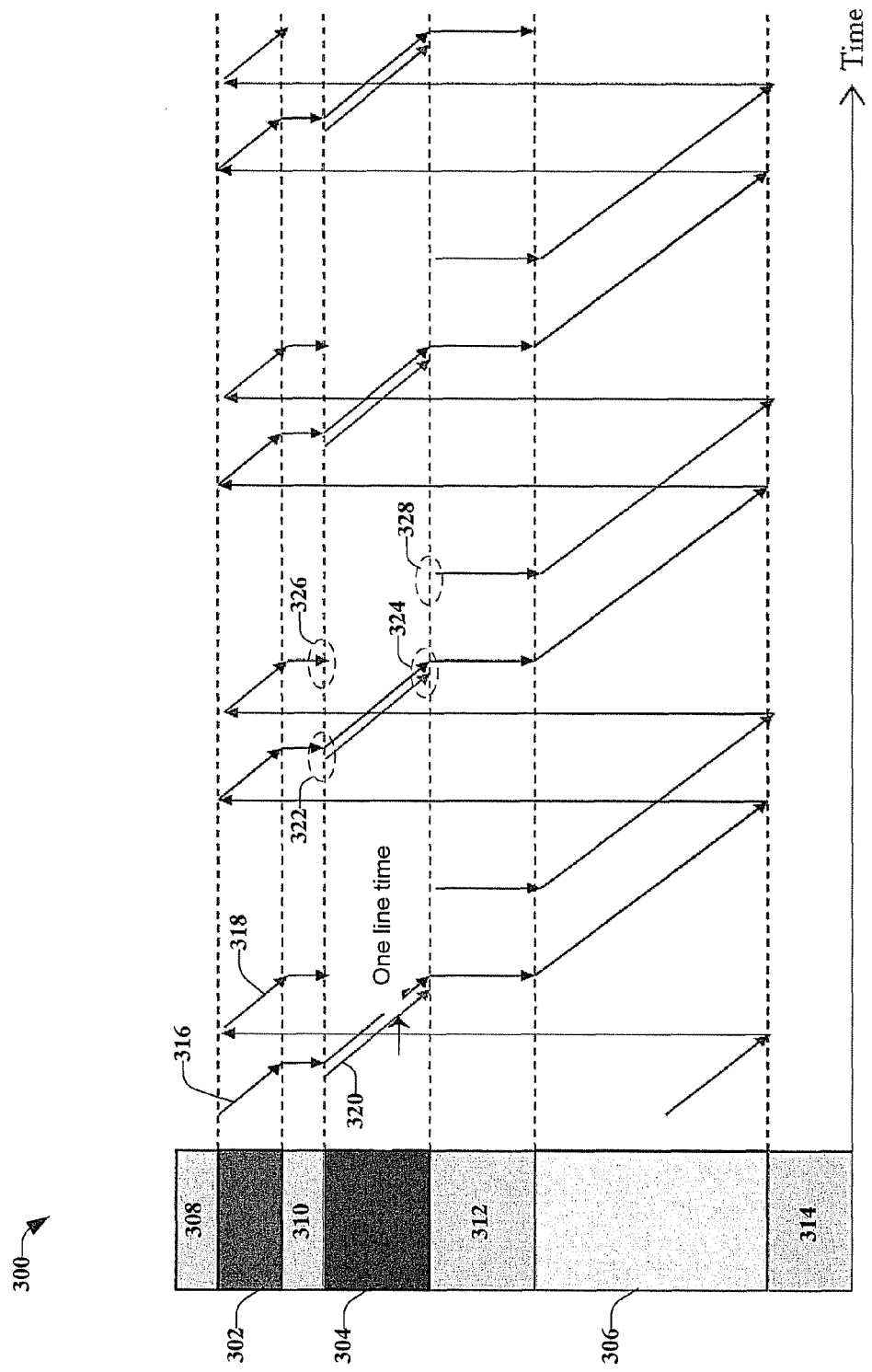
FIG. 3 illustrates a first example implementation, according to an aspect.

To provide further details related to the disclosed aspects, FIG. 3 illustrates a first example implementation 300, according to an aspect. For purposes of explanation, the simplistic case of zero vertical blanking is considered. In the figure, a simplified view of the array is considered. For example, the dummy OBs and the bottom OB rows are not illustrated. Further, there are only OBs at the top of the array in this simplified view. P2 is assumed to be active in the dummy rows when it is not present (e.g., disappears) in FIG. 3.

Time is illustrated along the horizontal axis. The OB Clamp OB Rows are indicated at 302, the Column FPN Correction OB Rows are indicated at 304, and Clear Window Rows are indicated at 306. Unread rows are indicated at 308, 310, 312, and 314. Further, P1 is indicated by line 316, P2 is indicated by line 318, and P4 is indicated by line 320.

FIG. 3 illustrates an implementation wherein the fourth pointer (P4) is idle when the column FPN OB rows 304 are not being read. In this case, pointer P4 320 is transient and comes into existence one line (in time) before pointer P1 316 arrives at the first column FPN OB row 304. This is indicated, in one example instance, by dashed oval 322. Pointer P4 320, arriving one line (in time) before pointer P1 316, provides one line of integration. Pointer P4 320 disappears one line before the last column FPN row 304 is read, as indicated in one example instance by dashed oval 324.

Pointer P2 318 and P3 (not shown for purposes of simplicity) do not visit the column FPN OB rows 304. Instead pointer P2 318 and P3 are diverted to the dummy rows when they reach the first column FPN OB row, as indicated by dashed ovals 326 and 328, in two example instances.

The example implementation of FIG. 3 does not provided for anti-blooming protection, which can be acceptable in various implementations. Since pointer P4 320 is only active for a small fraction of the frame time (e.g., during the FPN OB row), it can introduce an imbalance in the activity levels throughout the frame. For example, in sub-frame integration mode, the environment seen by pointer P2 318 can change while pointer P2 318 is occupied resetting rows which are mid-frame. This could potentially lead to a visible bar in the image. To mitigate this effect, pointer P4 320 can be sent to a subset of dummy rows when it is not needed. To implement sending pointer P4 320 to the dummy rows, a set of dummy rows can be allocated to pointer P4. To mitigate collisions, the set of dummy rows allocated to pointer P4 are independent of a set of dummy rows allocated to pointer P2 318. Thus, according to the aspects that utilize pointer P4 without blooming protection, physical rows served by pointer P4 are not visited by pointer P2 nor pointer P3 and physical rows served by pointer P2 and/or pointer P3 are not visited by pointer P4, which can mitigate pointer collision.

Figure 4:
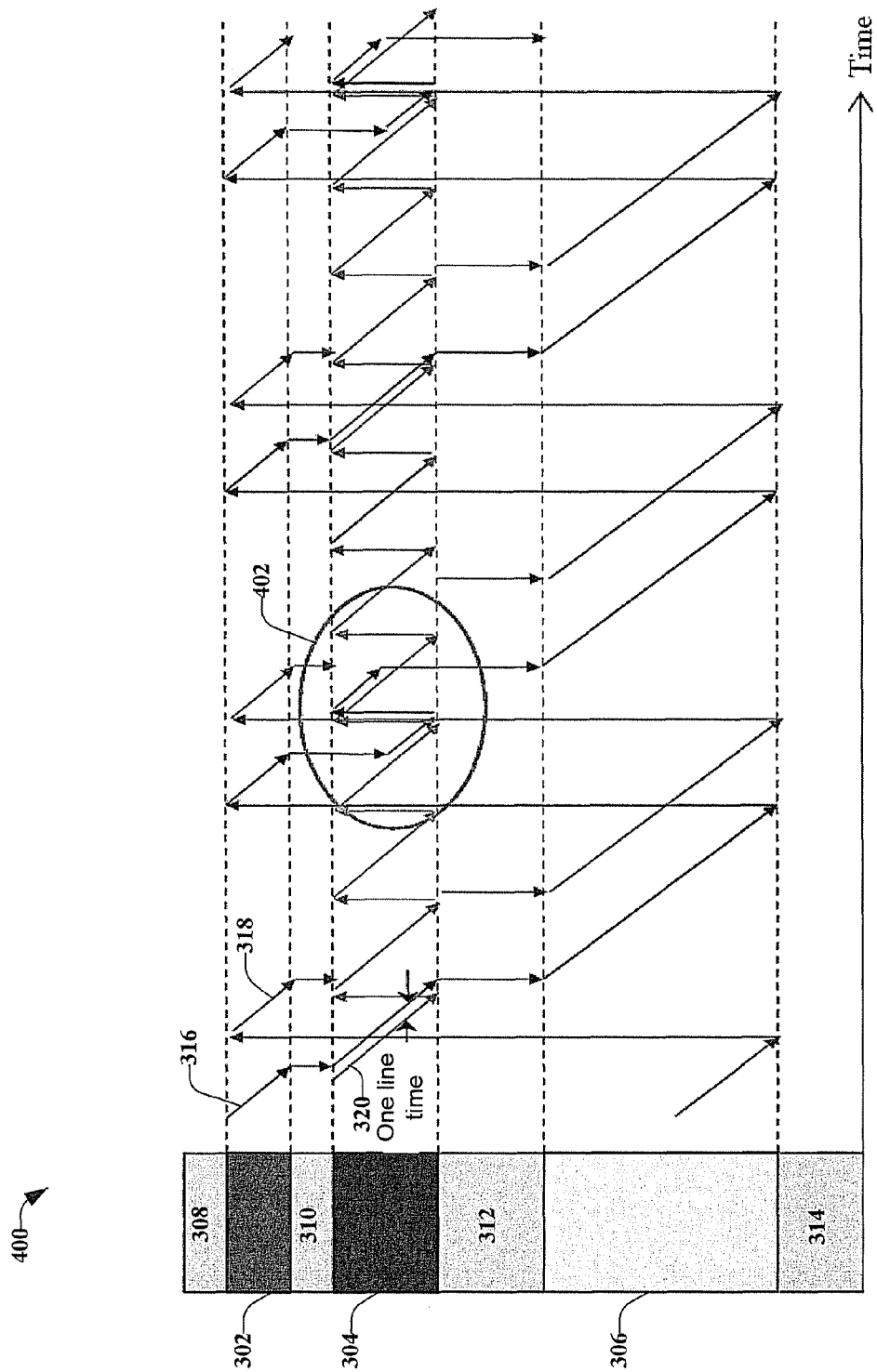
FIG. 4 illustrates a second exemplary implementation that utilizes a continuously rotating pointer, according to an aspect.

FIG. 4 illustrates a second exemplary implementation 400 that utilizes a continuously rotating pointer P4, according to an aspect. For purposes of explanation, the simplistic case of zero vertical blanking is considered and the dummy OBs are not shown. Further, there are only OBs at the top of the array for purposes of simplicity.

An advantage of the option to continuously rotate pointer P4 320 is that the environment seen by pointer P2 318 can be uniform throughout the frame, which should mitigate the possibility of viewing a bar in the image, as discussed above with reference to FIG. 3. If the frame period is not an exact multiple of the number of column FPN OB rows 304, the entry point (within the column FPN OB rows 304) for pointer P1 316, which provides a single line of integration, can vary frame to frame.

As illustrated by oval 402, on the second cycle, pointer P1 316 is entering the FPN OB rows 304 midway through the window. In order to complete its requisite cycle of OBs, pointer P1 316 can jump to the start of the window when it reaches the end and then exit mid-window.

Figure 5:
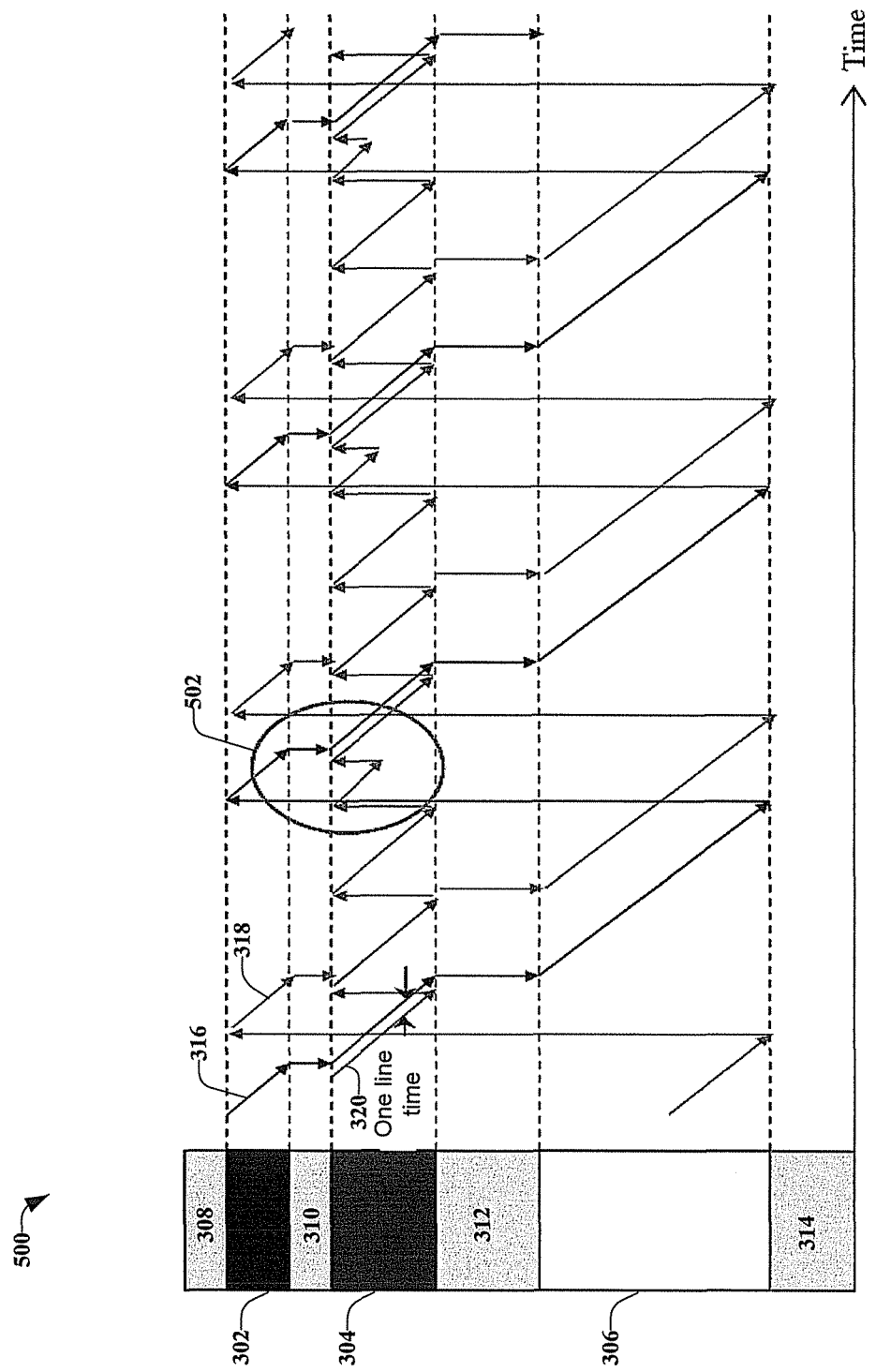
FIG. 5 illustrates a third exemplary implementation that utilizes a jumping pointer, according to an aspect.

FIG. 5 illustrates a third exemplary implementation 500 that utilizes a jumping pointer P4, according to an aspect. For purposes of explanation, the simplistic case of zero vertical blanking is considered and the dummy OBs are not shown. Also, there are only OBs at the top of the array for purposes of simplicity.

An alternative to having a variable pointer P1 316 entry point is to have the first row within the window read first and to charge the pointer P4 320 with the function of jumping in order to maintain a single line of integration. This can simplify the implementation of the pointer P1 316 at the expense of the pointer P4 320. Starting with a different physical FPN OB each frame should not compromise the FPN correction.

As indicated by the oval 502, pointer P4 320 is observed to jump (e.g. on the second cycle) in order to arrive the first FPN OB row one line before pointer P1 316 arrives.

Figure 6:
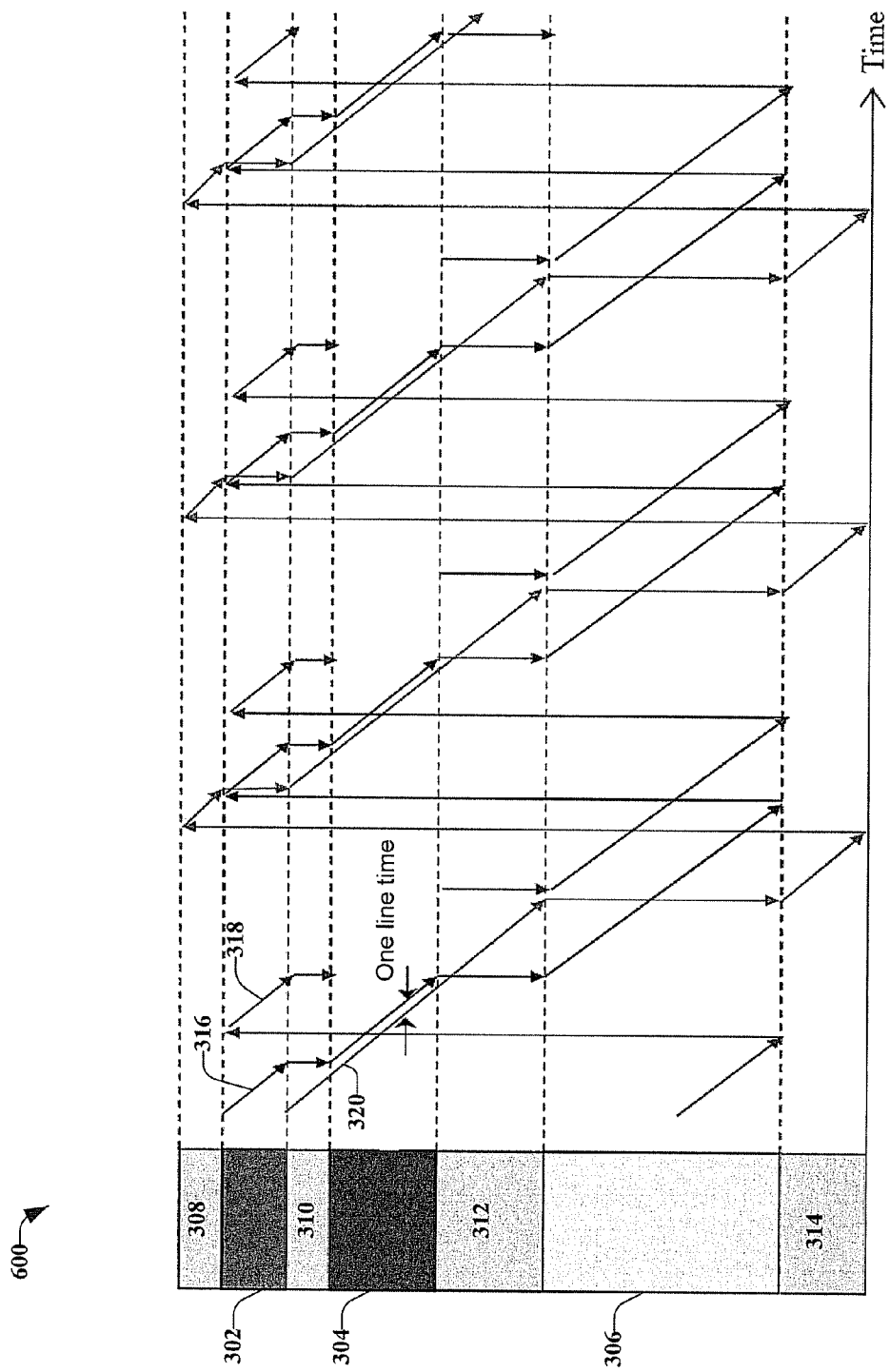
FIG. 6 illustrates a fourth exemplary implementation that incorporates anti-blooming features, according to an aspect.

FIG. 6 illustrates a fourth exemplary implementation 600 that incorporates anti-blooming features, according to an aspect. For purposes of explanation, the simplistic case of zero vertical blanking is considered and the dummy OBs are not shown. Further, there are only OBs at the top of the array for purposes of simplicity.

In accordance with this aspect, pointer P4 320 does not need to be confined to the FPN OB rows 304. Rather than have pointer P4 320 cycle the FPN OB window, pointer P4 320 could extend its region of activity to rows which are never read (e.g., rows not visited by pointer P1, pointer P2, or pointer P3).

In some aspects, rows that neighbor the read rows are not reset thereby allowing signal to continue to accumulate, which can create an issue as the rows may bloom into the first and last read rows either in the vertical clear or vertical OB windows. In accordance with an aspect, pointer P4 320 cycles all of the unread rows and jumps back to the start of the FPN OB window when it needs to, to stay one line ahead (in time) of pointer P1 316. It should be noted that if there are more unread rows in the array than read rows, not all rows may be reset unless, having finished the FPN OB rows, pointer P4 320 returns to the position from which it jumped and continues its cycle. In this case, each unread row will be reset less than once per frame on average (as opposed to never being reset).

In the case of skipping rows (and/or columns) to facilitate image preview capability without having to read through the entire sensor, pointer P4 320 could also be used to reset the intermediate rows in between the sampled rows. Further, physical rows which are served by pointer P4 320 are not visited by pointer P2 318 or pointer P3. Therefore, the risk of pointer collision is mitigated.

Figure 7:
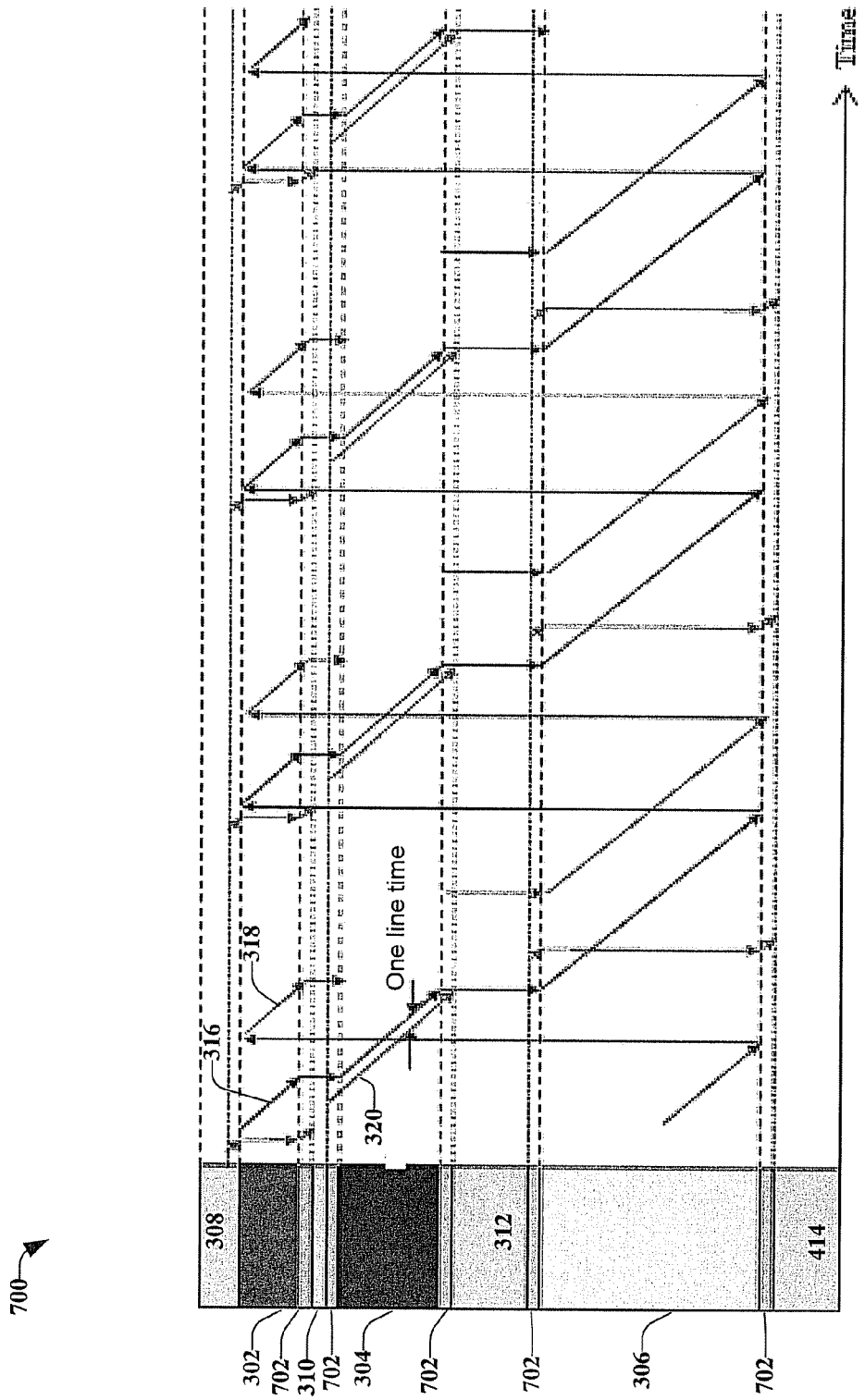
FIG. 7 illustrates a fifth exemplary implementation that incorporates anti-blooming features and synchronous operation, according to an aspect.

FIG. 7 illustrates a fifth exemplary implementation 700 that incorporates anti-blooming features and synchronous operation, according to an aspect. For purposes of explanation, when the pointers are not visible, the pointers are assumed to be active in a small subset of dummy rows. The pixels indicated by rows 702 are reset by pointer P4 320 to protect the active windows from blooming.

In this example, there is no jumping of pointer P4 320. Pointer P4 320 is only used to reset a small number of extra rows around the active windows to protect against blooming. Further, pointer P4 320 can be synchronized to the frame, which can provide for a simpler RTL (resistor-transistor logic) coding embodiment while maintaining various advantages.

When pointer P4 320 is idle, pointer P4 320 continuously cycles around a small subset of dummy rows (similar to pointer P2 318) in order to maintain balanced activity profile throughout the frame.

In view of the aspects shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 8:
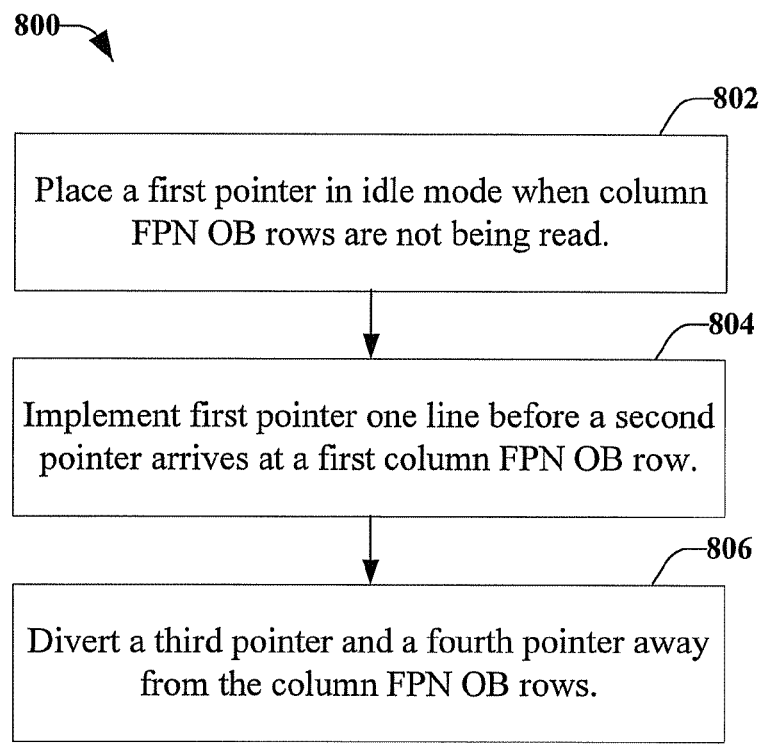
FIG. 8 illustrates a method for improved optically black reference pixels in a complementary metal-oxide-semiconductor imaging system-on-chip sensor, according to an aspect.

FIG. 8 illustrates a method 800 for improved optically black reference pixels in a complementary metal-oxide-semiconductor (CMOS) imaging system-on-chip (iSoC) sensor, according to an aspect. In accordance with some aspects, method can improve quality of optically black reference pixels by enabling shortening of the integration time relative to the active pixel integration time. At 802, a pointer P4 is placed in idle mode when column fixed pattern noise (FPN) optical black (OB) rows are not being read. At 804, pointer P4 is implemented one line before pointer P1 arrives at a first column FPN OB row. At 806, pointer P2 and pointer P3 are diverted away from the column FPN OB rows when pointer P2 and pointer P3 reach the column FPN OB rows.

In accordance with some aspects, placing pointer P4 in idle mode includes allocating a first subset of dummy rows to pointer P4 and a second subset of dummy rows to pointer P2. The first subset of dummy rows are independent of the second subset of dummy rows. Placing pointer P4 in idle mode also includes sending pointer P4 to first subset of dummy rows when the column FPN OB rows are not being read.

According to some aspects, method 800 can include continuously rotating pointer P4 within the column FPN OB rows. In accordance with another aspect, method 800 can include jumping pointer P4 on the second cycle, wherein pointer P4 arrives at the first FPN OB row one line before pointer P1 arrives at the first FPN OB row.

In another aspect, method can include extending an activity region of pointer P4 to rows that are not read. Further to this aspect, method 800 can include cycling pointer P4 within the rows that are not read and jumping pointer P4 to a start of the FPN OB window one line ahead of pointer P1.

In accordance with some aspects, method 800 can include using pointer P4 to reset a set of extra rows around active windows. Further to this aspect, method 800 includes synchronizing pointer P4 to a frame.

According to some aspects, the integration time for the OB pixels can be made smaller than the integration time for actual imaging pixels. The shorter integration time can reduce dark current accumulation and concomitant noise, thereby improving the optical black pixels by increasing the accuracy for determining FPN offset values based on the OB processing.

Figure 9:
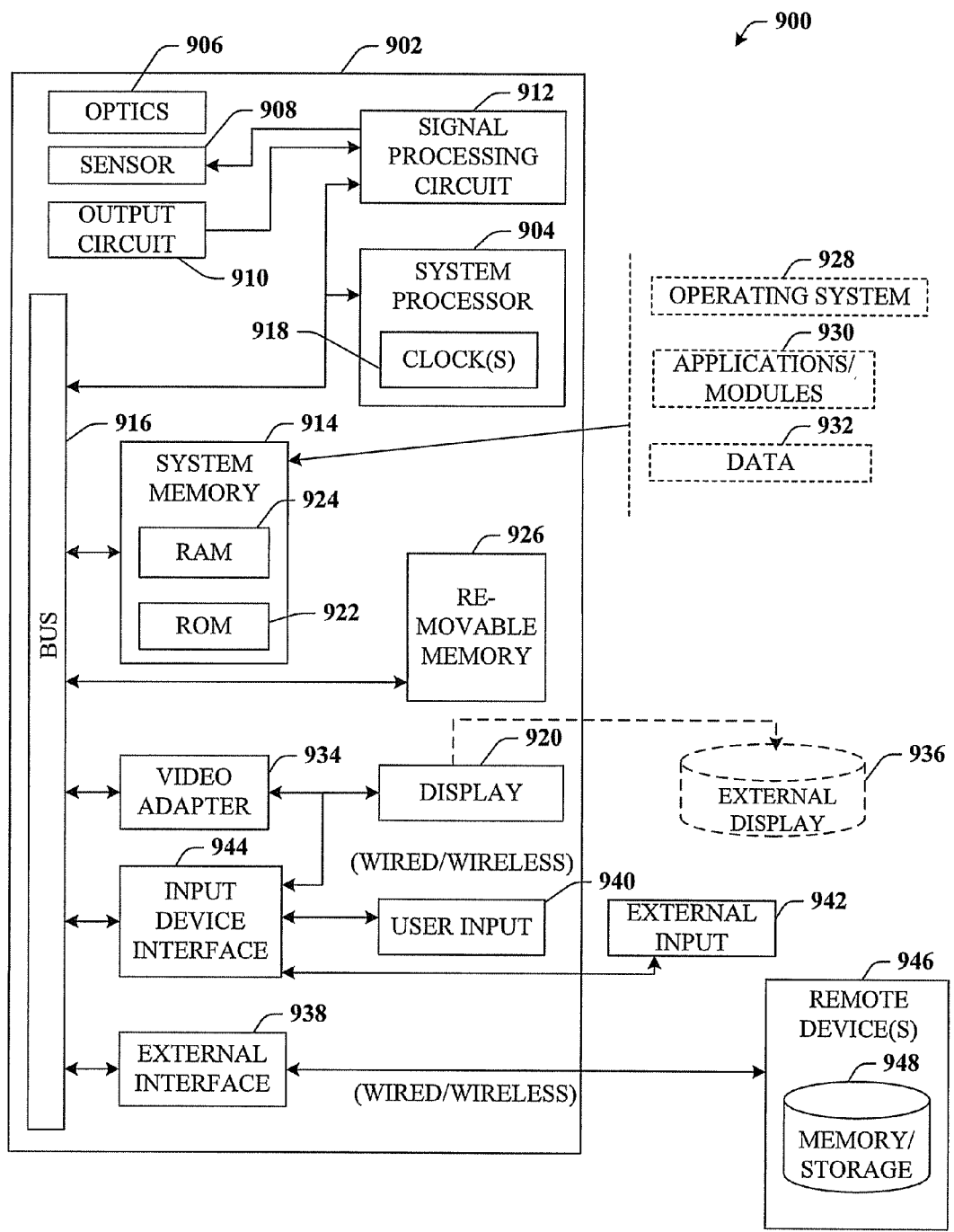
FIG. 9 illustrates a block diagram of an exemplary digital camera system operable to execute the disclosed architecture, according to an aspect.

Referring now to FIG. 9, illustrated is a block diagram of an exemplary digital camera system operable to execute the disclosed architecture, according to an aspect. In order to provide additional context for various aspects of the various embodiments, FIG. 9 and the following discussion are intended to provide a brief, general description of a suitable electronic computing environment 900 in which the various aspects of the various embodiments can be implemented. Additionally, while the various embodiments described above may be suitable for application in the general context of instructions that may run or be executed in conjunction with an electronic device, those skilled in the art will recognize that the various embodiments also can be implemented in combination with other program modules and/or as a combination of hardware and software.

Generally, program modules include routines, programs, components, data structures, etc., that perform particular tasks associated with electronic computing environment 900. Moreover, those skilled in the art will appreciate that the disclosed aspects can be practiced with other electronic system configurations, including hand-held computing devices, microprocessor-based or programmable consumer electronics, single-processor or multiprocessor state machines, minicomputers, as well as personal computers, and the like, each of which can be operatively coupled to one or more associated devices.

The illustrated aspects of the various embodiments may also be practiced in distributed computing environments where certain tasks are performed by remote processing devices that are linked through a wired or wireless communications network. In a distributed computing environment, program modules can be located in both local and remote memory storage devices.

An electronic processing device typically includes a variety of computer-readable media. Computer-readable media can be any available media that can be accessed by the electronic processing device and includes both volatile and non-volatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, or any other medium which can be used to store the desired information and which can be accessed by the electronic processing device.

Continuing to reference FIG. 9, the exemplary electronic processing environment 900 for implementing various aspects of one or more of the various embodiments includes a digital camera 902, the digital camera 902 includes a system processor 904, optics 906, an image sensor 908, an output circuit 910, a signal processing circuit 912, a system memory 914 and a system bus 916. The system bus 916 couples to system components including, but not limited to, the system memory 914 to the system processor 904. The system processor 904 can be a suitable semiconductor processing device manufactured for digital camera 902, or any of various commercially available processors. Dual microprocessors and other multi-processor architectures may also be employed as the system processor 904.

Optics 906 can comprise one or more lens elements comprised of refractive material. The refractive material can be suitable to refract electromagnetic radiation, particularly in the visible spectrum, but also the near infrared or ultraviolet spectra, or other suitable spectra. Particularly, optics 906 can be configured to project and focus an image of an object onto image sensor 908. Optics can also be configured with an actuator (not depicted) to mechanically adjust optics 906 to focus objects at varying distances from digital camera 902.

Image sensor 908 can comprise any of various sensors for receiving electromagnetic radiation and generating electric signals proportionate to a magnitude of the electromagnetic radiation. For instance, image sensor 908 can comprise a video tube, a charge-coupled device, or a CMOS device, or the like, or an array of such devices. In a particular example, image sensor 908 can comprise an array of photodetectors. Electric signals generated by image sensor 908 can be transferred to output circuit 910, in response to a clock signal generated by an electronic clock(s) 918 managed by system processor 904. The electric signals can then be output to signal processing circuit 912 for image processing.

Signal processing circuit 912 can be any suitable hardware or software processing entity, including an integrated circuit(s), an application specific integrated circuit(s) (ASIC), a state machine, or other suitable signal processing device. Signal processing circuit 912 can be configured to perform operations on electric signals provided by output circuit 910. These operations can include correlated double sampling, gamma processing, analog to digital conversion, gain adjustment, interpolation, compression, or a combination thereof or of the like, to generate digital data to be adapted for presentation on an electronic display 920 of digital camera 902. Additionally, signal processing circuit 912 can store the digital data in system memory 914 before, during and after the operations.

The system bus 916 can be any of several types of bus structure suitable for communicatively connecting components of digital camera 902. System bus 916 can further interconnect to a memory bus (with or without a memory controller), a peripheral bus, and a local bus using any of a variety of commercially available bus architectures. The system memory 914 can include read-only memory (ROM) 922 and random access memory (RAM) 924. A basic input/output system (BIOS) for digital camera 902 can be stored in a non-volatile memory such as ROM, EPROM, EEPROM, which BIOS contains the basic routines that help to transfer information between elements within the digital camera 902, when powered on for instance. The RAM 924 can include a high-speed RAM such as static RAM for caching data. Furthermore, digital camera can include removable memory 926, which can include any suitable non-volatile memory (e.g., Flash memory), or other removable memory technology.

A number of program modules can be stored in the system memory 914, including an operating system 928, one or more application programs or program modules 930 and program data 932. All or portions of the operating system, applications, modules, and/or data can also be cached in the RAM 924. It is appreciated that the various embodiments can be implemented with various commercially available or proprietary operating systems or combinations of operating systems.

The display 920 is connected to the system bus 916 via an interface, such as a video adapter 934. Display 920 can comprise a flat panel display, such as a liquid crystal display, a light-emitting diode display, or the like. System processor 904 can control output of image data to present a digital replica of the image received by image sensor 908 on display 920. In addition, digital camera 902 can output the image data to an external display 936 via a suitable external interface 938.

A user can enter commands and information (e.g., user input 940) and/or other external input 942 can be entered into the digital camera 902 through one or more input devices, e.g., touch screen buttons, switches, dials, levers, etc. For instance, zoom functionality is often implemented by pressing a button, dial, lever, etc., in one direction to zoom in, or another direction to zoom out. Further, display options, selection of images, and similar display commands can be input via a touch screen, often implemented as part of display 920. Other input devices (not shown) may include a microphone, an IR remote control, a joystick, a game pad, a stylus pen, or the like. These and other input devices are often connected to the system processor 904 through an input device interface 944 that is coupled to the system bus 916, but can be connected by other interfaces, such as a parallel port, an IEEE1394 serial port, a game port, a USB port, an IR interface, a Bluetooth interface, etc.

The external interface 938 can include at least one or both of Universal Serial Bus (USB) and IEEE1394 interface technologies. Other external connection technologies are within contemplation of the subject matter claimed herein. Moreover, external interface 938 can include a wireless technology, such as a Wi-Fi communication technology, Bluetooth™ technology, infrared (IR) technology, cellular technology, or the like. In addition to an external display, external interface 938 can facilitate communicatively coupling digital camera 902 to one or more remote devices 946. Remote device(s) 946 can include a computer, a display, a memory or storage device 948, and so on. Moreover, commands can be given to digital camera 902 from remote device(s) 942 over external interface 938 to system processor 904. This can facilitate remote control of digital camera 902, for remote camera operation (e.g., taking pictures, adding or deleting pictures from system memory 914, etc.), transferring data, such as stored digital images, updating operation system 928, applications/program modules 930, or data 932, and so on.

The digital camera 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so forth), and telephone. This includes at least Wi-Fi and Bluetooth wireless technologies. Thus, the communication can be a predefined structure as with a conventional network or simply an ad hoc communication between at least two devices.

Wi-Fi, or Wireless Fidelity, allows connection to the Internet from various locations within range of a WiFi access point, without wires. Wi-Fi is a wireless technology similar to that used in a cell phone that enables such devices, e.g., computers, to send and receive data indoors and out; within the range of the access point. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
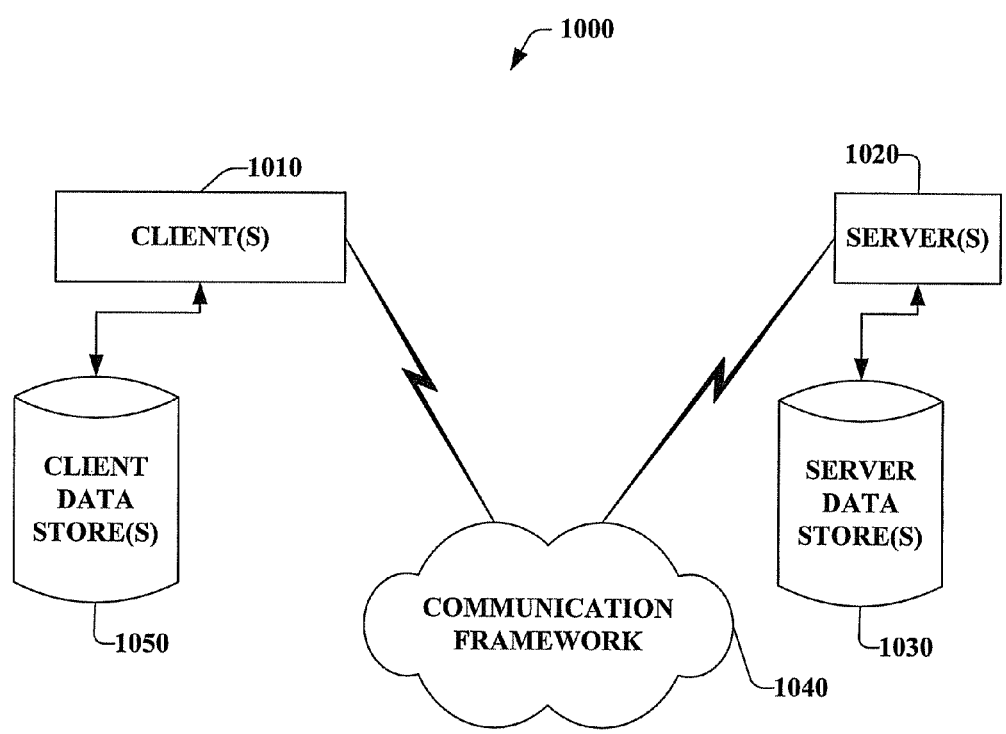
FIG. 10 is a schematic block diagram of a sample-computing environment with which the disclosed embodiments can interact, according to an aspect.

FIG. 10 is a schematic block diagram of a sample-computing environment 1000 with which the disclosed embodiments can interact, according to an aspect. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor, may also be implemented as a combination of computing processing units.

In the subject specification and annexed drawings, terms such as "store," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and dire Rambus RAM (DRRAM). Additionally, the disclosed memory components of systems or methods herein are intended to comprise, without being limited to comprising, these and any other suitable types of memory.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system for improved optically black reference pixels in a complementary metal-oxide-semiconductor imaging system-on-chip sensor, comprising:
    a read component configured to indicate pixels to be read out during a readout time interval and control a first reset function that operates optically black rows used for fixed pattern noise correction;
    a first reset component configured to indicate pixels to be reset during the readout time interval and control a second reset function;
    a second reset component configured to control a third reset function based on changes to a vertical window or an integration time during the readout time interval, wherein the third reset function does not have a constant input pulse; and
    a control component configured to retain the integration time of the optically black reference pixels of column fixed pattern noise rows at a minimal value, control a fourth reset function by causing the fourth reset function to enter an idle mode when the optically black reference pixels are not being read out, and implement the fourth reset function before the read component implements the first reset function, wherein the integration time of the optically black reference pixels of column fixed pattern noise rows is independent of another integration time of other rows and the optically black reference pixels are used to measure the column fixed pattern noise.

2. The system of claim 1, wherein the control component is further configured to mitigate blooming into sampled rows from surrounding rows, the sampled rows are optical black rows and the surrounding rows are rows adjacent the optical black rows, and wherein the adjacent rows were not reset during the readout time interval.

3. The system of claim 1, wherein the control component is further configured to mitigate blooming into sampled rows from surrounding rows, the sampled rows are a first clear row and a last clear row and the surrounding rows are contiguous non-reset rows.

4. The system of claim 1, wherein the control component is further configured to cause the fourth reset function to continuously rotate within the column fixed pattern noise rows, wherein an input pulse of the second reset function is uniform through a frame based on the continuous rotation of the fourth reset function.

5. The system of claim 1, wherein to implement the fourth reset function before the read component implements the first reset function, the control component is further configured to cause the fourth reset function to jump on a cycle, wherein the fourth reset function is implemented at a first fixed pattern noise optically black row at least one line before the first reset function is implemented at the first fixed pattern noise optically black row.

6. The system of claim 1, wherein the control component is further configured to extend an activity region of the fourth reset function to rows that are not read.

7. The system of claim 1, wherein the control component is further configured to cycle the fourth reset function within rows that are not read and jump the fourth reset function to a start of a fixed pattern noise optically black window at least one line ahead of the first reset function.

8. The system of claim 1, wherein the control component is further configured to use the fourth reset function to reset a set of extra rows around active windows.

9. The system of claim 8, wherein the control component is further configured to synchronize the fourth reset function to a frame.

10. A method, comprising:
    indicating pixels to be read out during a readout time interval based on implementation of a first reset function that operates optically black rows used for fixed pattern noise correction;
    indicating pixels to be reset during the readout time interval based on implementation of a second reset function;
    determining a change to a vertical window or an integration time during the readout time interval;
    controlling a third reset function based on the change, wherein the third reset function does not have a constant input pulse; and retaining the integration time of the optically black reference pixels of column fixed pattern noise rows at a minimal value comprising retaining the integration time of column fixed pattern noise rows independent of another integration time of other rows based on implementation of a fourth reset function, wherein the fourth reset function is implemented before the first reset function is implemented, wherein the optically black reference pixels are used to measure the column fixed pattern noise.

11. The method of claim 10, further comprises using a vertical pointer to mitigate blooming into sampled rows from surrounding rows.

12. The method of claim 10, further comprises causing the fourth reset function to continuously rotate within the column fixed pattern noise rows, wherein an input pulse of the second reset function is uniform through a frame based on the continuous rotation of the fourth reset function.

13. The method of claim 10, further comprises causing the fourth reset function to jump on a cycle, wherein the fourth reset function arrives at a first fixed pattern noise optically black row at least a line before the first reset function arrives at the first fixed pattern noise optically black row.

14. The method of claim 10, further comprises extending an activity region of the fourth reset function to rows that are not read.

15. The method of claim 10, further comprising:
cycling the fourth reset function within rows that are not read; and
jumping the fourth reset function to a start of a fixed pattern noise optically black window at least a line ahead of the first reset function.

16. The method of claim 10, further comprises using the fourth reset function to reset a set of extra rows around active windows.

17. The method of claim 10, further comprises synchronizing the fourth reset function to a frame.

18. A system, comprising:
a read component configured to indicate pixels to be read out during a readout time interval and control a first reset function that operates optically black rows used for fixed pattern noise correction;
a first reset component configured to indicate pixels to be reset during the readout time interval and control a second reset function;
a second reset component configured to control a third reset function based on changes to a vertical window or an integration time during the readout time interval, wherein the third reset function does not have a constant input pulse; and
a control component configured to maintain the integration time of the optically black reference pixels of column fixed pattern noise rows at a first value, and another integration time of other rows at a second value, wherein the first value and the second value are different values, the control component is further configured to control a fourth reset function, and wherein the optically black reference pixels are used to measure the column fixed pattern noise.

19. The system of claim 18, further comprises a vertical pointer configured to mitigate blooming into sampled rows from surrounding rows.

20. The system of claim 18, wherein the control component is configured to cause the fourth reset function to continuously rotate within the column fixed pattern noise rows, wherein an input pulse of the second reset function is uniform through a frame based on the continuous rotation of the fourth reset function.

* * * * *